US010157048B2

United States Patent
Cook et al.

(10) Patent No.: US 10,157,048 B2
(45) Date of Patent: Dec. 18, 2018

(54) SPLITTING OPERATORS IN A STREAMING APPLICATION

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 15/423,932

(22) Filed: Feb. 3, 2017

(65) Prior Publication Data

US 2018/0225100 A1 Aug. 9, 2018

(51) Int. Cl.
*G06F 9/45* (2006.01)
*G06F 8/41* (2018.01)

(52) U.S. Cl.
CPC ...................... *G06F 8/41* (2013.01)

(58) Field of Classification Search
CPC ......................................... G06F 8/41
USPC .......................................... 717/144
See application file for complete search history.

(56) References Cited

U.S. PATENT DOCUMENTS

| 6,311,265 | B1* | 10/2001 | Beckerle | G06F 8/20 712/203 |
| 7,797,691 | B2* | 9/2010 | Cockx | G06F 8/456 710/71 |
| 7,886,283 | B2* | 2/2011 | Nacul | G06F 8/456 717/137 |
| 8,332,862 | B2* | 12/2012 | Isard | G06F 8/433 709/201 |

(Continued)

FOREIGN PATENT DOCUMENTS

CN 102123286 A 7/2011

OTHER PUBLICATIONS

IEEE Transactions on Parallel and Distributed Systems ( vol. 25, Issue: 6, Jun. 2014)—Elastic Scaling for Data Stream Processing; Bǔgra Gedik ; Scott Schneider ; Martin Hirzel ; Kun-Lung Wu. pp. 1447-1463; Date of Publication: Dec. 5, 2013.*

(Continued)

*Primary Examiner* — Francisco J Aponte
(74) *Attorney, Agent, or Firm* — Martin & Associates, LLC; Derek P. Martin

(57) ABSTRACT

An operator split mechanism analyzes code in a streaming application according to specified split criteria to determine when an operator in the streaming application can be split. At compile-time, when an operator satisfies the split criteria, the operator split mechanism splits the operator according to the split criteria. In an integrated development environment (IDE), the operator split mechanism determines when an operator satisfies the split criteria, and splits the operator (Continued)

according to the split criteria. The operator split mechanism can operate in an automatic mode where operators are split without further input from the user, or in a more interactive mode where the operator split mechanism provides recommendations and options to a user, who makes appropriate selections, and the operator split mechanism then functions according to the selections by the user.

15 Claims, 7 Drawing Sheets

(56) References Cited

U.S. PATENT DOCUMENTS

| | | | | |
|---|---|---|---|---|
| 8,380,965 | B2* | 2/2013 | Bouillet | G06F 9/4494 712/220 |
| 8,448,155 | B2* | 5/2013 | Bordelon | G06F 8/4452 717/109 |
| 8,490,072 | B2* | 7/2013 | Andrade | G06F 8/433 717/132 |
| 8,782,628 | B2* | 7/2014 | Andrade | G06F 8/433 717/156 |
| 8,949,810 | B2 | 2/2015 | Andrade et al. | |
| 8,954,418 | B2* | 2/2015 | Faerber | G06F 17/30404 707/718 |
| 9,038,041 | B2 | 5/2015 | Salz et al. | |
| 9,146,775 | B2 | 9/2015 | Branson et al. | |
| 9,298,788 | B1 | 3/2016 | Kekre et al. | |
| 9,680,718 | B2* | 6/2017 | Branson | H04L 65/4069 |
| 9,805,101 | B2* | 10/2017 | Singh | G06F 17/30539 |
| 9,917,900 | B2* | 3/2018 | Branson | H04L 67/1097 |
| 9,990,236 | B2* | 6/2018 | Zhang | H04L 29/08 |
| 10,042,611 | B2* | 8/2018 | Barsness | G06F 8/20 |
| 2008/0133891 | A1* | 6/2008 | Salz | G06F 8/30 712/220 |
| 2008/0134158 | A1* | 6/2008 | Salz | G06F 8/34 717/148 |
| 2008/0235685 | A1* | 9/2008 | Amini | G06F 9/4494 718/100 |
| 2009/0249309 | A1* | 10/2009 | Li | G06F 11/3636 717/132 |
| 2009/0300615 | A1* | 12/2009 | Andrade | G06F 9/5066 718/100 |
| 2010/0229178 | A1* | 9/2010 | Ito | G06F 9/5083 718/104 |
| 2010/0241827 | A1* | 9/2010 | Yu | H04L 12/44 712/30 |
| 2012/0259910 | A1* | 10/2012 | Andrade | G06F 9/5066 709/201 |
| 2013/0013534 | A1* | 1/2013 | Chang | G06Q 10/00 706/12 |
| 2013/0166948 | A1* | 6/2013 | Branson | G06F 11/0793 714/15 |
| 2014/0196017 | A1* | 7/2014 | Halim | G06F 8/45 717/149 |
| 2014/0372428 | A1* | 12/2014 | Mathis | G06F 17/30569 707/736 |
| 2014/0380266 | A1* | 12/2014 | Bornhoevd | G06F 8/20 717/104 |
| 2015/0128135 | A1* | 5/2015 | Cao | G06F 17/30958 718/1 |
| 2016/0124769 | A1 | 5/2016 | Bragstad et al. | |

OTHER PUBLICATIONS

Parallel Architectures and Compilation Techniques (PACT), 2012 21st International Conference—Auto-parallelizing stateful distributed streaming applications; Scott Schneider ; Martin Hirzel ; Bugra Gedik ; Kun-Lung Wu—Date of Conference: Sep. 19-23, 2012.*
Khandekar et al., "COLA: Optimizing Stream Processing Applications via Graph Partitioning", Middleware 2009, pp. 308-327 (2009).
Castro et al., "Integrating Scale Out and Fault Tolerance in Stream Processing using Operator State Management", Proceedings of the 2013 ACM SIGMOD International Conference on Management of Data, pp. 725-736 (2013).
English Abstract for Chinese patent reference CN102123286B, 2013.

* cited by examiner

| Split Criteria | |
|---|---|
| Type | Criteria |
| Parallel | Operator has Output(s) Dependent on Subset(s) of Inputs |
| Serial | Code in Operator has a Transition Region where the Only Connection Between Code Segments is a Small Number of Variables that can be Passed Between Operators |

```
public final void process(StreamingInput<Tuple> inputStream, Tuple tuple)
        throws Exception {

// Create a new table for output port 0

StreamingOutput<OutputTuple> outStream = getOutput(0);
    OutputTuple outTuple = outStream.newTuple();
    String a = tuple.getString("a");
    String b = tuple.getString("b");
    String c = tuple.getString("c");
    String d = tuple.getString("d");

If a.equalsIgnoreCase("exclamatory")) {
        b += "!";
    }

If (c.equalsIgnoreCase("exclamatory")) {
        d += "!";
    } outTuple.setString("b", b);

outTuple.setString("d", d);

// Submit new tuple to output port 0
    outStream.submit(outTuple);

```
public final void process(StreamingInput<Tuple> inputStream, Tuple tuple)
        throws Exception {

// Create a new table for output port 0

StreamingOutput<OutputTuple> outStream = getOutput(0);
    OutputTuple outTuple = outStream.newTuple();
    String a = tuple.getString("a");
    String b = tuple.getString("b");
    String c = tuple.getString("c");
    String d = tuple.getString("d");

String x = performanceIntensiveMethod(a,b,c);
    String y = perfromanceIntensivemethod2(d,x);

x = modifyXMethod(x,y);   //performance intensive
    Y = modifyYMethod(y,x);   //performance intensive outTuple.setString("x", x);

outTuple.setString("y", y);

// Submit new tuple to output port 0
    outStream.submit(outTuple);

}
```

Region A: String a = tuple.getString("a"); String b = tuple.getString("b"); String c = tuple.getString("c"); String d = tuple.getString("d");

Transition Region: String x = performanceIntensiveMethod(a,b,c); String y = perfromanceIntensivemethod2(d,x);

Region B: x = modifyXMethod(x,y); Y = modifyYMethod(y,x); outTuple.setString("x", x); outTuple.setString("y", y);

FIG. 8

SPLITTING OPERATORS IN A STREAMING APPLICATION

BACKGROUND

1. Technical Field

This disclosure generally relates to streaming applications, and more specifically relates to splitting operators in streaming applications.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next operator. Streaming applications are becoming more common due to the high performance that can be achieved from near real-time processing of streaming data.

One type of streaming application is a distributed streaming application that includes multiple operators that can be executed on different computer systems. Writing distributed streaming applications requires planning the code in a way that spreads it over the available computer systems. Developers who are new to stream computing may write an entire application as a single operator. This defeats the entire goal of distributing the application over multiple computer systems, because the one operator will be run on a single host computer system. In addition, developers who are new to stream computing may lack the knowledge and/or expertise to know how and where to split their code into different operators.

BRIEF SUMMARY

An operator split mechanism analyzes code in a streaming application according to specified split criteria to determine when an operator in the streaming application can be split. At compile-time, when an operator satisfies the split criteria, the operator split mechanism splits the operator according to the split criteria. In an integrated development environment (IDE), the operator split mechanism determines when an operator satisfies the split criteria, and splits the operator according to the split criteria. The operator split mechanism can operate in an automatic mode where operators are split without further input from the user, or in a more interactive mode where the operator split mechanism provides recommendations and options to a user, who makes appropriate selections, and the operator split mechanism then functions according to the selections by the user.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 4 is a table that shows examples of split criteria;

FIG. 5 shows a snippet of pseudo-code;

FIG. 8 shows a snippet of pseudo-code;

DETAILED DESCRIPTION

The disclosure and claims herein are directed to an operator split mechanism that analyzes code in a streaming application according to specified split criteria to determine when an operator in the streaming application can be split. At compile-time, when an operator satisfies the split criteria, the operator split mechanism splits the operator according to the split criteria. In an integrated development environment (IDE), the operator split mechanism determines when an operator satisfies the split criteria, and splits the operator according to the split criteria. The operator split mechanism can operate in an automatic mode where operators are split without further input from the user, or in a more interactive mode where the operator split mechanism provides recommendations and options to a user, who makes appropriate selections, and the operator split mechanism then functions according to the selections by the user.

Figure 1:
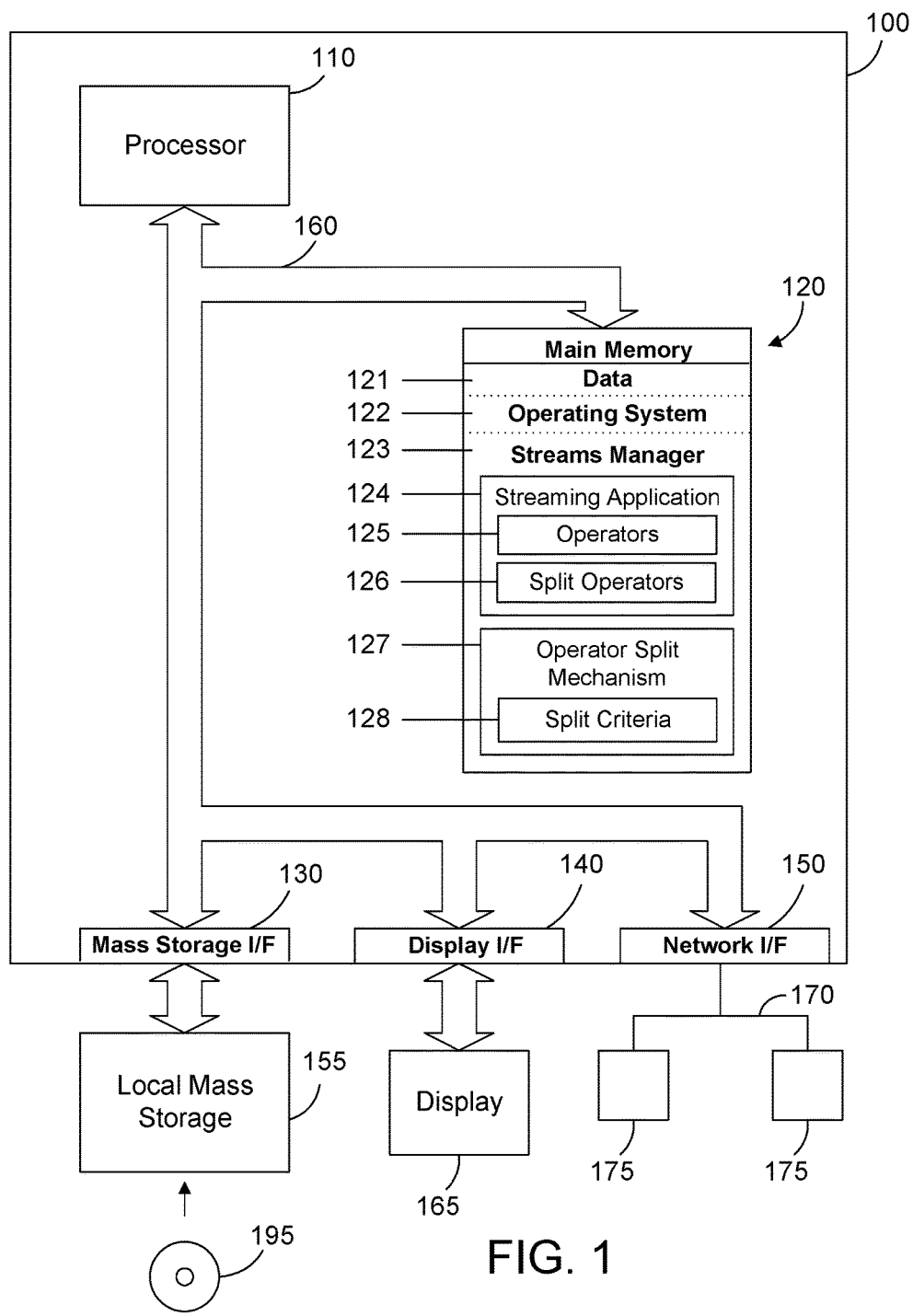
FIG. 1 is a block diagram of a computer system that includes an operator split mechanism that splits operators in a streaming application.

Referring to FIG. 1, a computer system 100 is one suitable implementation of a server computer system that includes an operator split mechanism as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a runtime environment that executes a streaming application 124. The streaming application 124 preferably comprises a flow graph that includes operators 125 that process data tuples. The streaming application 124 may include one or more split operators 126 that are generated from operators 125, as described in more detail below.

The streams manager 123 includes an operator split mechanism 127 that analyzes operators 125 in the streaming application 124 according to specified split criteria 128. The split criteria preferably specifies at least one criterion that, when satisfied, results in the operator split mechanism 127 splitting an operator into two or more operators, as explained in more detail below. The operator split mechanism 127 is shown in FIG. 1 as part of the streams manager 123 as one possible implementation. One skilled in the art will recognize the operator split mechanism 127 could be software separate from the streams manager 123. For example, the operator split mechanism 127 could be part of a compiler or could be part of an integrated development environment (IDE), as described in the detailed examples given below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, streams manager 123 and operator split mechanism 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124. Processor 110 also executes the operator split mechanism 127.

Although computer system 100 is shown to contain only a single processor and a single system bus, those skilled in the art will appreciate that an operator split mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
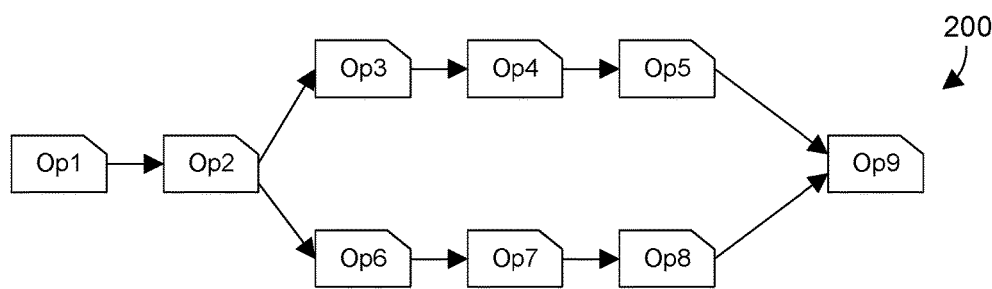
FIG. 2 is a block diagram of a sample streaming application.

Referring to FIG. 2, an extremely simplified streaming application 200 is shown. The streaming application 200 includes nine operators Op1-Op9. Op1 is a source operator that produces data tuples and passes data tuples to Op2 for processing. Op2 processes the data tuples it receives from Op1 and routes some of those tuples to Op3 and others to Op4. Op3 operates on tuples it receives from Op2 and sends the resulting tuples to Op4. Op4 operates on tuples it receives from Op3 and sends the resulting tuples to Op5. Op5 operates on tuples it receives from Op4 and sends the resulting tuples to Op9. Op6 operates on tuples it receives from Op2 and sends the resulting tuples to Op7. Op7 operates on tuples it receives from Op6 and sends the resulting tuples to Op8. Op8 operates on tuples it receives from Op7 and sends the resulting tuples to Op9. Op9 receives tuples from both Op5 and Op8, and is a sink for those tuples. The operator split mechanism 127 in FIG. 1 can operate to split any suitable operator, such as any of operators Op1-Op9 shown in FIG. 2, provided the operator satisfies one or more of the split criteria.

Figure 3:
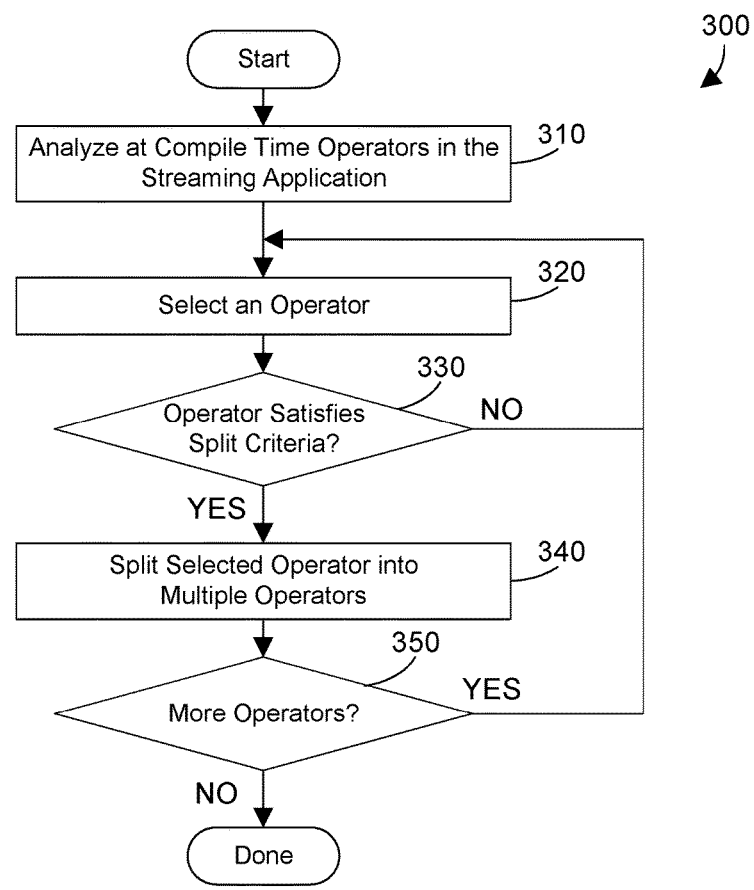
FIG. 3 is a flow diagram of a method for automatically splitting an operator in a streaming application at compile-time.

Referring to FIG. 3, a method 300 is preferably performed by the operator split mechanism 127 shown in FIG. 1. In one specific scenario, the operator split mechanism 127 functions at compile time, when the code that defines the operators in a streaming application is compiled. The operators in the streaming application are analyzed at compile time (step 310). An operator is selected (step 320). When the operator does not satisfy the split criteria (step 330=NO), method 300 loops back to step 320 and continues. When the operator satisfies the split criteria (step 330=YES), the selected operator is split into multiple operators (step 340). When there are more operators to process (step 350=YES), method 300 loops back to step 320 and continues until all operators in the streaming application have been processed (step 350=NO), at which time method 300 is done.

In one specific implementation, the splitting of the selected operator into multiple operators in step 340 is done automatically without requiring any input by a user. This allows the operator split mechanism to function without interacting with the user. In an alternative implementation, the split of the selected operator into multiple operators in step 340 may include making recommendations and providing options to the user, who can then select to take the recommendations with selected options. The operator split mechanism may thus operate either automatically without user input, or alternatively may operate in a way that interacts with a user to partially automate a process that would normally have to be done manually by the user, namely, the splitting of an operator into two or more operators.

The splitting of operators discussed herein helps the performance of a distributed streaming application by providing more operators that could be distributed across more distributed computer systems. For example, if an operator is split into three operators, this means each of the three operators could be deployed to a separate computer system. If the operator were to remain unsplit, the single operator would be deployed to a single computer system. Thus, splitting the operator allows three computer systems to do the work that would be required of a single computer system if the operator were not split. Splitting the operator provides a finer level of granularity in the program that provides more opportunities for enhancing the performance of the streaming application by deploying more operators to different distributed computer systems.

Referring to FIG. 4, a table 400 shows some sample split criteria that could be used by the operator split mechanism. The split criteria in FIG. 4 are suitable examples of the split criteria 128 shown in FIG. 1. Parallel split criteria 410 specifies an operator may be split into parallel operators when the operator has one or more outputs that are dependent on one or more subsets of the inputs of the operator. Serial split criterial 420 specifies an operator may be split into serial operators when the code in the operator has a transition region where the only connection between code segments is a relatively small number of variables that can be passed as data between operators. Examples of these split criteria 410 and 420 in FIG. 4 are presented in detail below.

Figure 6:
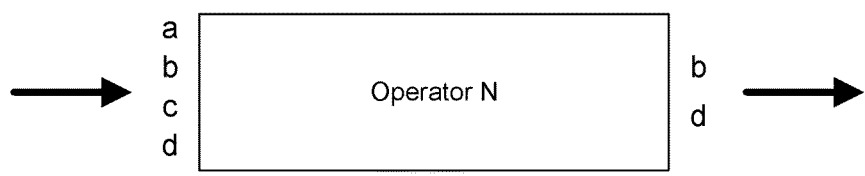
FIG. 6 is a block diagram showing the configuration of an operator for the pseudo-code in FIG. 5 showing input data and output data.
Figure 7:
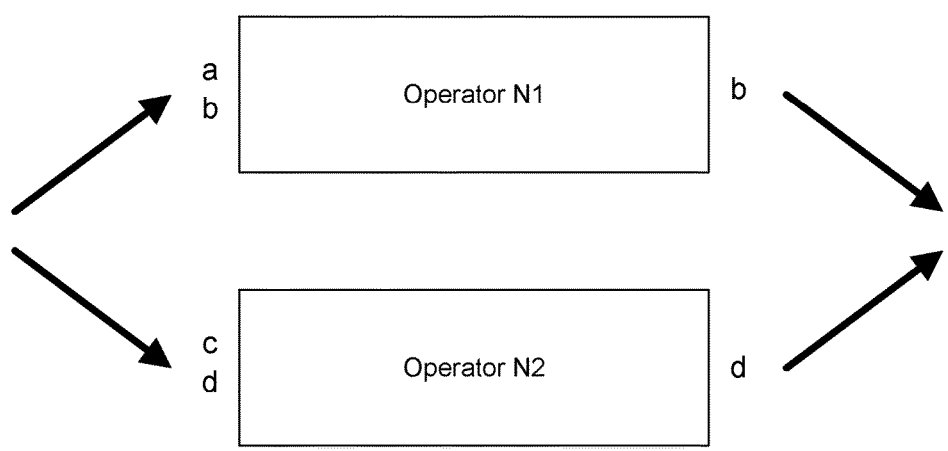
FIG. 7 is a block diagram showing how the operator N in FIG. 6 can be split into two parallel operators N1 and N2.

FIG. 5 shows a sample snippet of pseudo-code for an operator. We see from the code in FIG. 5 there are regions of the code that are independent of each other. Regions 510A, 510B and 510C are independent of regions 520A, 520B and 520C. These independent regions allow for performing a parallel split of the operator, as shown graphically in FIGS. 6 and 7, because this operators satisfies the parallel split criteria 410 shown in FIG. 4. We assume operator N in FIG. 6 is representative of the operator in the pseudo-code in FIG. 5. The data input to operator N includes a, b, c and d. The data output of operator N includes b and d. Due to the independent code portions identified above, and based on the parallel spit criteria 410, operator N can be split into two parallel operators N1 and N2, as shown in FIG. 7. Operator N1 includes the code in regions 510A, 510B and 510C in FIG. 5, which takes a and b as input and produces b at the output, as shown in FIG. 7. Operator N2 includes the code in regions 520A, 520B and 520C in FIG. 5, which takes c and d as input and produces d at the output, as shown in FIG. 7. This very simple example shows how an operator that satisfies the parallel split criteria 410 in FIG. 4 can be split into multiple parallel operators. While this specific example in FIGS. 5-7 shows splitting one operator into two parallel operators, the concepts herein can be extended to splitting one operator into any suitable number of parallel operators.

Figure 9:
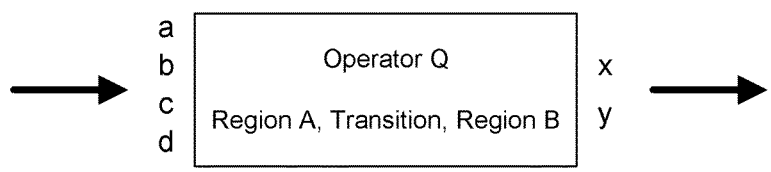
FIG. 9 is a block diagram showing the configuration of an operator for the pseudo-code in FIG. 8 showing input data and output data.
Figure 10:
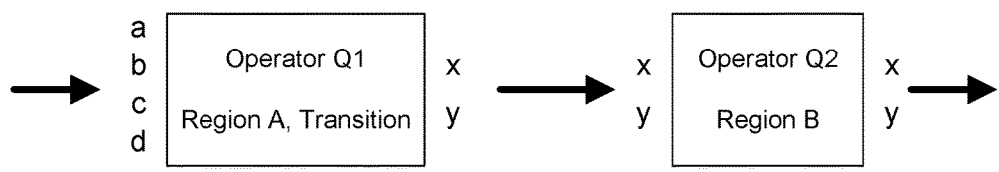
FIG. 10 is a block diagram showing how the operator Q in FIG. 9 can be split into two series operators Q1 and Q2.

FIG. 8 shows a sample snippet of pseudo-code for an operator. We see from the code in FIG. 8 there are two regions of code, namely regions A and B, that are joined by a transition region that has a relatively small amount of data, namely x and y. The pseudo-code in FIG. 8 satisfies the serial split criteria 420, which means the operator can be split into two serial operators, as shown graphically in FIGS. 9 and 10. We assume Operator Q in FIG. 9 is representative of the operator in the pseudo-code in FIG. 8, and includes Region A, Transition Region, and Region B, as shown in both FIGS. 8 and 9. The data input to operator Q includes a, b, c and d. The data output of operator Q includes x and y. We assume that x and y are performance-intensive functions, as noted in FIG. 8. This means performance can be increased if more than one operator processes the code in FIG. 8. Because operator Q satisfies the serial split criteria 420 in FIG. 4, operator Q can be split into two serial operators Q1 and Q2, as shown in FIG. 10. Operator Q1 includes the code in region A and the transition region, and has inputs of a, b, c and d and outputs of x and y. Operator Q2 includes the code in region B, and includes inputs of x and y and outputs of x and y. While this specific example in FIGS. 8-10 shows splitting one operator into two serial operators, the concepts herein can be extended to splitting one operator into any suitable number of serial operators.

In both of the examples given above, where operator N in FIG. 6 was split into parallel operators N1 and N2 shown in FIG. 7, and where operator Q in FIG. 9 was split into two serial operators Q1 and Q2 shown in FIG. 10, there are more operators after the split than before. Splitting operators as described herein provides opportunities to enhance the performance of a streaming application because separate operators can be deployed to separate computer systems, thereby enhancing the performance of the streaming application.

FIG. 3 shows an example of a suitable method for analyzing and splitting operators at compile time. Similar methods could be used for splitting operators in an integrated development environment (IDE) as shown by the example method 1100 shown in FIG. 11. Operators in the streaming application are analyzed in an IDE (step 1110). An operator is selected (step 1120). When the operator does not satisfy any split criteria (step 1130=NO), method 1100 loops back to step 1120 and continues. When the operator satisfies one or more of the split criteria (step 1130=YES), the operator split mechanism provides one or more recommendations and options for splitting the selected operator to the user (step 1140). When the user does not select to split the operator (step 1150=NO), method 1100 loops back to step 1120 and continues. When the user selects to split the operator (step 1150=YES), the selected operator is split into multiple operators according to the split criteria and according to the user-selected options (step 1160). When there are more operators to process (step 1170=YES), method loops back to step 1120 and continues, until there are no more operators to process (step 1170=NO), at which time method 1100 is done.

Figure 11:
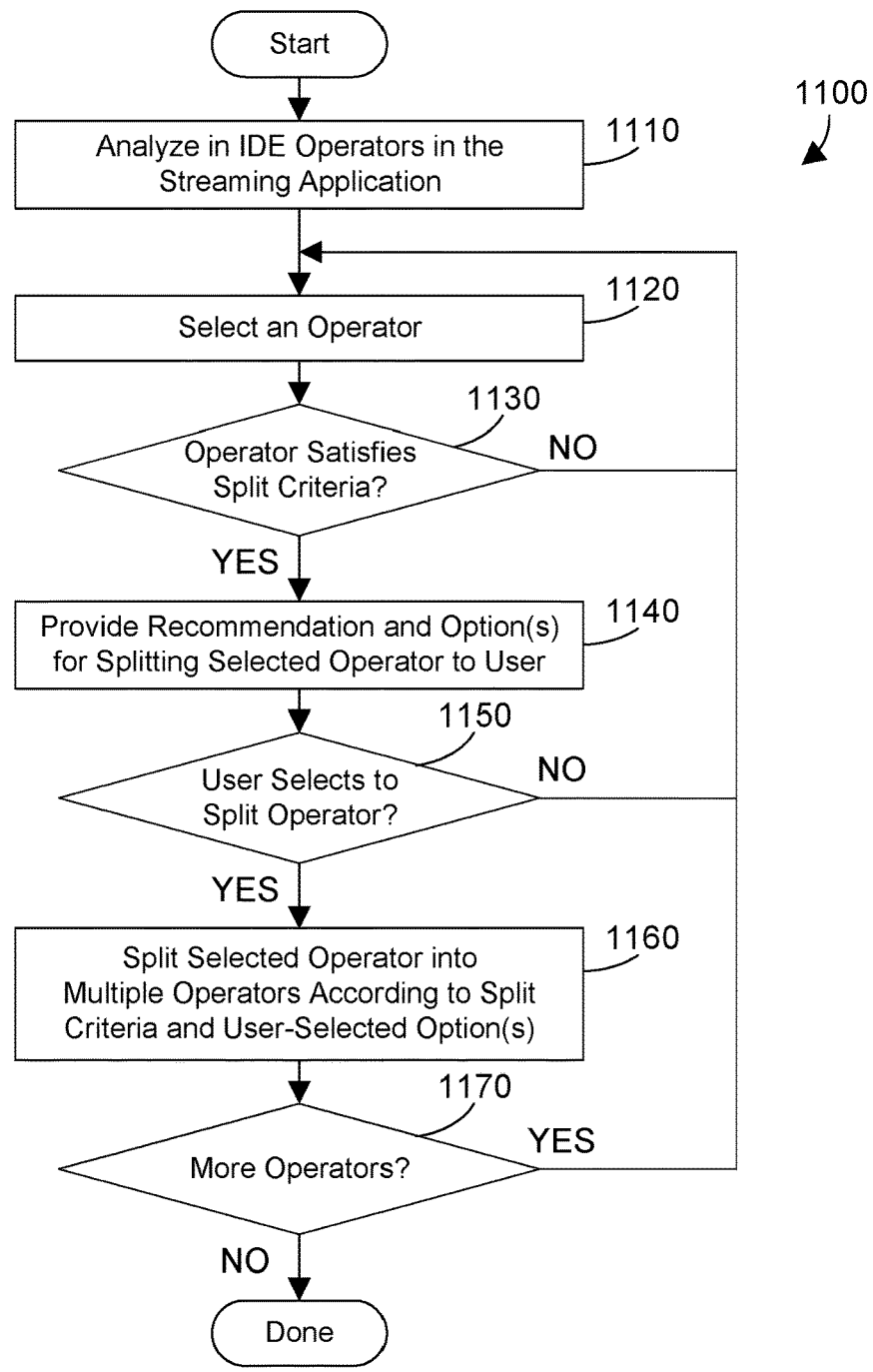
FIG. 11 is a flow diagram of a method for recommending to a user the splitting of operators in an integrated development environment (IDE).

Method 1100 in FIG. 11 shows the operator split mechanism functioning in a way that interacts with the user to perform the splitting of operators in an IDE. Note, however, this same interactive approach could be used by the operator split mechanism when splitting operators at compile-time. One skilled in the art will recognize that many of the concepts in FIGS. 3 and 11 can be mixed and matches as needed to provide the desired functionality in any particular environment. For example, method 300 in FIG. 3 could be modified to require user interaction to perform splitting of an operator at compile time, and method 1100 in FIG. 11 could be modified so the splitting of operators in an IDE could be performed automatically without requiring further input from the user. These and other variations are within the scope of the disclosure and claims herein.

The split criteria shown in FIG. 4 are shown by way of example, and are not limiting. Other factors could be specified in the split criteria within the scope of the disclosure and claims herein. For example, the split criteria could be based on estimates of how performance-intensive each section of independent code is. For operators in sections of code that are not performance-intensive, no real performance gain would be seen by splitting these operators. The performance of the code could be estimated using a static code analysis at compile-time. In the alternative, the performance of code could be based on historical data gathered from actual executions of the code. In either case, the split criteria may include some threshold of performance so that operators that are beneath the threshold are not split while those that are above the threshold are split. Another factor that could be specified in the split criteria is the number of attributes that are independent. The disclosure and claims herein expressly extend to any suitable measure or criterion that could be included in the split criteria to determine whether to split or not to split operators.

Many of the concepts herein have been simplified for the purpose of illustration. For example, methods 300 in FIG. 3 and 1100 in FIG. 11 both assume all operators in a streaming application are selected and considered for splitting, one at a time. In practice, any suitable method could be used for determining whether one or more of the operators in a streaming application are eligible for splitting according to any suitable defined split criteria. For example, let's assume the split criteria includes a specification that an operator is only considered for splitting if the operator consumes more than some threshold of CPU cycles. Instead of considering the operators one by one as shown in FIGS. 3 and 11, the operators could first be compared to the threshold of CPU cycles, with all operators that do not satisfy the threshold of CPU cycles being eliminated from consideration for being split. The specific methods in FIGS. 3 and 11 are extremely simplified for ease of illustrating specific cases. The disclosure and claims herein expressly extend to any suitable split criteria applied to any or all operators in a streaming application in any manner or order.

An operator split mechanism analyzes code in a streaming application according to specified split criteria to determine when an operator in the streaming application can be split. At compile-time, when an operator satisfies the split criteria, the operator split mechanism splits the operator according to the split criteria. In an integrated development environment (IDE), the operator split mechanism determines when an operator satisfies the split criteria, and splits the operator according to the split criteria. The operator split mechanism can operate in an automatic mode where operators are split without further input from the user, or in a more interactive mode where the operator split mechanism provides recommendations and options to a user, who makes appropriate selections, and the operator split mechanism then functions according to the selections by the user.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streaming application residing in the memory that comprises a flow graph that includes a first plurality of operators that process a plurality of data tuples; and
an operator split mechanism residing in the memory and executed by the at least one processor, the operator split mechanism analyzing the first plurality of operators, and when a selected one of the first plurality of operators satisfies at least one split criterion, the operator split mechanism splits the selected one operator into a second plurality of operators according to the at least one split criterion, wherein the at least one split criterion specifies to split the selected one operator into series operators when code in the selected one operator comprises a transition region between a code segment preceding the transition region and a code segment following the transition region, wherein the transition region comprises a number of variables that can be passed between operators, wherein the number of variables in the transition region is less than a number of variables in the code segment preceding the transition region.

2. The apparatus of claim 1 wherein the operator split mechanism runs at compile-time.

3. The apparatus of claim 1 wherein the operator split mechanism is part of a compiler.

4. The apparatus of claim 1 wherein the operator split mechanism performs the split of the selected one operator into the second plurality of operators automatically without input from a user.

5. The apparatus of claim 1 wherein the operator split mechanism runs in an integrated development environment.

6. The apparatus of claim 1 wherein operator split mechanism provides at least one recommendation to a user to split the selected one operator and splits the selected one operator into the second plurality of operators according to at least one option selected by the user.

7. The apparatus of claim 1 wherein the at least one split criterion specifies to split the selected one operator into parallel operators when the selected one operator has inputs and one or more outputs dependent on one or more subsets of the inputs.

8. A computer-implemented method executed by at least one processor, the method comprising:
providing a streaming application that comprises a flow graph that includes a first plurality of operators that process a plurality of data tuples;
analyzing the first plurality of operators; and
when a selected one of the first plurality of operators satisfies at least one split criterion, splitting the selected one operator into a second plurality of operators according to the at least one split criterion, wherein the at least one split criterion specifies to split the selected one operator into series operators when code in the selected one operator comprises a transition region between a code segment preceding the transition region and a code segment following the transition region, wherein the transition region comprises a number of variables that can be passed between operators, wherein the number of variables in the transition region is less than a number of variables in the code segment preceding the transition region.

9. The method of claim 8 wherein the analyzing the first plurality of operators and the splitting the selected one operator are performed at compile-time.

10. The method of claim 8 wherein the splitting the selected one operator into the second plurality of operators is performed automatically without input from a user.

11. The method of claim 8 wherein the analyzing the first plurality of operators and the splitting the selected one operator are performed in an integrated development environment.

12. The method of claim 8 further comprising:
providing at least one recommendation to a user to split the selected one operator; and splitting the selected one operator into the second plurality of operators according to at least one option selected by the user.

13. The method of claim 8 wherein the at least one split criterion specifies to split the selected one operator into parallel operators when the selected one operator has inputs and one or more outputs dependent on one or more subsets of the inputs.

14. A computer-implemented method executed by at least one processor, the method comprising:
providing a streaming application that comprises a flow graph that includes a first plurality of operators that process a plurality of data tuples;
providing a plurality of split criteria comprising:
parallel split criteria that specifies to split the selected one operator into parallel operators when the selected one operator has inputs and one or more outputs dependent on one or more subsets of the inputs; and
serial split criteria that specifies to split the selected one operator into series operators when code in the selected one operator comprises a transition region between a code segment preceding the transition region and a code segment following the transition region, wherein the transition region comprises a number of variables that can be passed between operators, wherein the number of variables in the transition region is less than a number of variables in the code segment preceding the transition region;
analyzing the first plurality of operators;
when a selected first of the first plurality of operators satisfies the parallel split criteria, the compiler automatically splitting without input from a user the selected first operator into the parallel operators; and
when a selected second of the first plurality of operators satisfies the serial split criteria, the compiler automatically splitting without input from a user the selected second operator into the series operators.

15. The method of claim 14 further comprising:
when a selected third of the first plurality of operators satisfies the at least one split criterion:
providing at least one recommendation to a user to split the selected third operator; and
splitting the selected third operator according to at least one option selected by the user.

* * * * *